United States Patent
Kioua et al.

(10) Patent No.: US 12,246,846 B2
(45) Date of Patent: Mar. 11, 2025

(54) AIRCRAFT PROPULSION UNIT COMPRISING A NACELLE AND A TURBOMACHINE INDEPENDENTLY SUPPORTED BY A WING, FUSELAGE OR TAIL ELEMENT

(71) Applicant: SAFRAN NACELLES, Gonfreville-l'Orcher (FR)

(72) Inventors: Hazem Kioua, Moissy-Cramayel (FR); Damien Lemoine, Moissy-Cramayel (FR); Pierre-Alain Reboul, Moissy-Cramayel (FR); Matthieu Menielle, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 44 days.

(21) Appl. No.: 18/251,095

(22) PCT Filed: Nov. 2, 2021

(86) PCT No.: PCT/FR2021/051917
§ 371 (c)(1),
(2) Date: Apr. 28, 2023

(87) PCT Pub. No.: WO2022/090677
PCT Pub. Date: May 5, 2022

(65) Prior Publication Data
US 2023/0406521 A1   Dec. 21, 2023

(30) Foreign Application Priority Data
Nov. 2, 2020 (FR) ..................... 2011207

(51) Int. Cl.
*B64D 29/06* (2006.01)
*B64D 27/40* (2024.01)
*B64C 30/00* (2006.01)

(52) U.S. Cl.
CPC ............. *B64D 27/40* (2024.01); *B64D 29/06* (2013.01); *B64C 30/00* (2013.01)

(58) Field of Classification Search
CPC ........ B64C 30/00; B64D 29/06; B64D 29/08; B64D 27/40
See application file for complete search history.

(56) References Cited

U.S. PATENT DOCUMENTS 3,137,460 A * 6/1964 Owl, Jr. ................ B64C 23/005
  244/15
4,458,863 A * 7/1984 Smith .................... B64D 27/18
  239/265.29

(Continued)

FOREIGN PATENT DOCUMENTS

| EP | 2202153 A2 | 6/2010 |
|----|-----------|--------|
| EP | 2631181 A2 | 8/2013 |
| FR | 2920409 A1 | 3/2009 |

OTHER PUBLICATIONS

International Search Report for issued in Application No. PCT/FR2021/051917 dated Feb. 4, 2022.
Written Opinion for PCT/FR2021/051917 dated Feb. 4, 2022.

*Primary Examiner* — Tye William Abell
(74) *Attorney, Agent, or Firm* — McDonald Hopkins LLC

(57) ABSTRACT

A propulsion unit for an aircraft, includes a support structure, a nacelle and a turbomachine. The support structure is configured to independently support, on the one hand, the turbomachine and, on the other hand, preferably by a cradle, an air inlet and/or a rear section of the nacelle.

11 Claims, 10 Drawing Sheets

(56) References Cited

U.S. PATENT DOCUMENTS

2005/0194493 A1* 9/2005 Marche ................. B64D 27/40
244/54
2008/0099611 A1* 5/2008 Martino Gonzalez .......................
B64D 29/08
244/119

* cited by examiner

AIRCRAFT PROPULSION UNIT COMPRISING A NACELLE AND A TURBOMACHINE INDEPENDENTLY SUPPORTED BY A WING, FUSELAGE OR TAIL ELEMENT

This is the National Stage of PCT international application PCT/FR2021/051917, filed on Nov. 2, 2021 entitled "AIRCRAFT PROPULSION UNIT COMPRISING A NACELLE AND A TURBOMACHINE INDEPENDENTLY SUPPORTED BY A WING, FUSELAGE OR TAIL ELEMENT", which claims the priority of French Patent Application No. 2011207 filed Nov. 2, 2020, both of which are incorporated herein by reference in their entireties.

TECHNICAL FIELD

The invention relates to the field of propulsion units for aircrafts.

PRIOR ART

In general, a modern airplane propulsion unit comprises a turbomachine, a nacelle and a pylon or more generally a support structure allowing connecting the turbomachine to a wing or to the fuselage of the airplane.

In conventional architectures, the nacelle comprises an air inlet and a gas ejection rear section each fastened to the turbomachine by means of flanges and bolts. The cantilevered mounting of these nacelle elements requires sizing the turbomachine accordingly, which increases its mass and furthermore leads to an increase in the dynamic loads applied on the turbomachine.

DISCLOSURE OF THE INVENTION

The invention aims to provide a propulsion unit allowing reducing the loads applied on the turbomachine.

To this end, an object of the invention is a propulsion unit for an aircraft, according to the features of claim 1.

The air inlet and/or the rear section of the nacelle being supported by the support structure, and not by the turbomachine, the loads applied on the turbomachine are reduced accordingly.

This also allows reducing the mass of the turbomachine since it is no longer necessary to equip the latter with means for supporting the air inlet and/or the rear section.

In one embodiment, the second connecting means comprise an intermediate support structure fastened to the support structure, the air inlet and/or the rear section of the nacelle being connected to the intermediate support structure.

Thus, it is possible to adapt the geometry of the intermediate support structure according to the shape of the turbomachine and more generally the space available within the propulsion unit while keeping a support structure with a simplified and/or conventional geometry.

Preferably, the intermediate support structure forms a cradle extending circumferentially around a longitudinal central axis of the propulsion unit.

Such a cradle allows at the same time improving holding of the air inlet and/or of the rear section, wrapping a portion of the turbomachine and dismounting and remounting the turbomachine without dismounting the cradle.

In one embodiment, the cradle has a circumferential dimension smaller than 180°.

In another embodiment, the cradle has a circumferential dimension larger than 180°.

In the latter case, the cradle may comprise a first fixed portion and a removable second portion so as to be able to move the turbomachine relative to the first portion in the context of a maintenance operation.

According to a first variant, the intermediate support structure comprises a front frame forming a ring section configured to fasten the air inlet of the nacelle thereto.

According to a second variant, the intermediate support structure comprises a rear frame forming a ring section configured to fasten the rear section of the nacelle thereto.

These variants may be combined so that, according to a third variant, the intermediate support structure comprises both a front frame forming a ring section configured to fasten the air inlet of the nacelle thereto and a rear frame forming a ring section configured to fasten the rear section of the nacelle thereto.

Preferably, the air inlet and/or the rear section of the nacelle are mounted cantilevered on the intermediate support structure.

According to one feature of the invention, the second connecting means comprise a hinge member configured to enable a movement of a nacelle element amongst the air inlet and the rear section between:
- a flight position, in which a central axis of said nacelle element and a longitudinal central axis of the propulsion unit are coincident with or parallel to each other, and
- a maintenance position, in which the central axis of said nacelle element and the longitudinal central axis of the propulsion unit are oblique or perpendicular to each other.

Of course, the previous features could apply to both the air inlet and the rear section of the nacelle or to only one of these nacelle elements.

The aforementioned maintenance position allows avoiding dismounting the corresponding nacelle element and avoiding, for this purpose, dismounting the turbomachine in order to carry out some maintenance operations.

This results in facilitation and an average reduction in the duration and cost of maintenance interventions.

In one embodiment, the movement of said nacelle element between the flight position and the maintenance position is carried out about an axis of rotation oblique or perpendicular with respect to the longitudinal central axis of the propulsion unit.

In one embodiment, the propulsion unit comprises one or more connecting rod(s) configured to hold said nacelle element in the maintenance position and to transmit forces from one to the other amongst the nacelle element and the support structure when the nacelle element is in the flight position.

Advantageously, the connecting rods may be removable and/or telescopic.

In one embodiment, the first connecting means pass through the second connecting means.

This allows reducing the bulk and/or the mass of the propulsion unit and more generally improving its architecture.

The invention also relates to an aircraft comprising a propulsion unit as defined hereinabove.

In one embodiment, said support structure forms a wing or fuselage or tail element.

In one embodiment, the aircraft forms a supersonic airplane.

Other advantages and features of the invention will appear upon reading the detailed, non-limiting description that follows.

BRIEF DESCRIPTION OF THE DRAWINGS

The following detailed description refers to the appended drawings wherein.

DETAILED DESCRIPTION OF SOME EMBODIMENTS

FIGS. 1 to 16 comprise a reference frame X, Y and Z respectively defining axial (or longitudinal), vertical and lateral directions that are orthogonal to one another.

Figure 1:
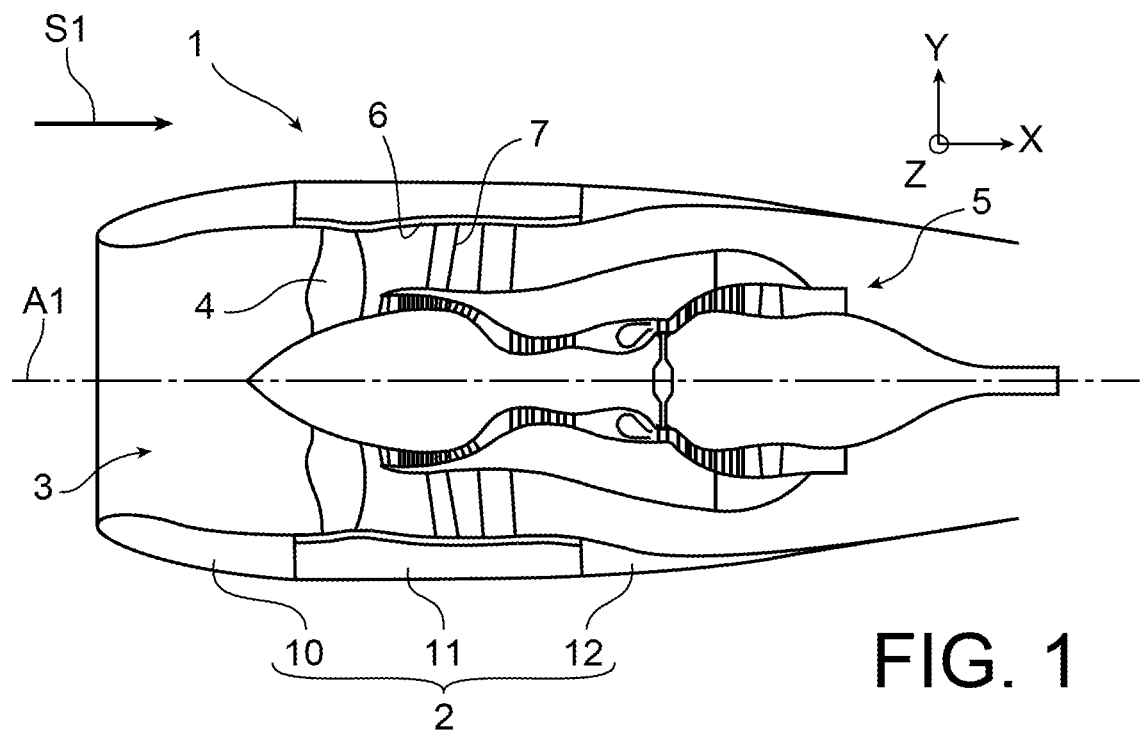
FIG. 1 is a schematic view of an aircraft propulsion unit.

A propulsion unit 1 for an aircraft is represented in FIG. 1, having a longitudinal central axis A1 parallel to the axial direction X.

The propulsion unit 1 comprises a nacelle 2 and a turbomachine 3.

In this example, the turbine engine 3 is a turbofan engine comprising, in a manner known per se, a fan 4, a gas generator 5 and an outer casing 6 connected to the gas generator 5 by structural arms 7.

The longitudinal central axis A1 forms an axis of rotation of a rotor of the turbomachine 3. The outer casing 6 of the turbomachine 3 extends axially forward of the propulsion unit 1 so as to surround the fan 4.

Throughout the description, the terms "front" and "rear" are defined with respect to a direction S1 of gas flow through the propulsion unit 1 according to the axial direction X.

In a manner known per se, the nacelle 2 comprises, from front to rear, a front section 10 forming an air inlet, an intermediate section 11 comprising fan cowls (not represented), and a gas ejection rear section 12.

In this example, the rear section 12 is a fixed shroud. In another embodiment, the rear section 12 comprises a thrust reverser (not represented).

Figure 2:
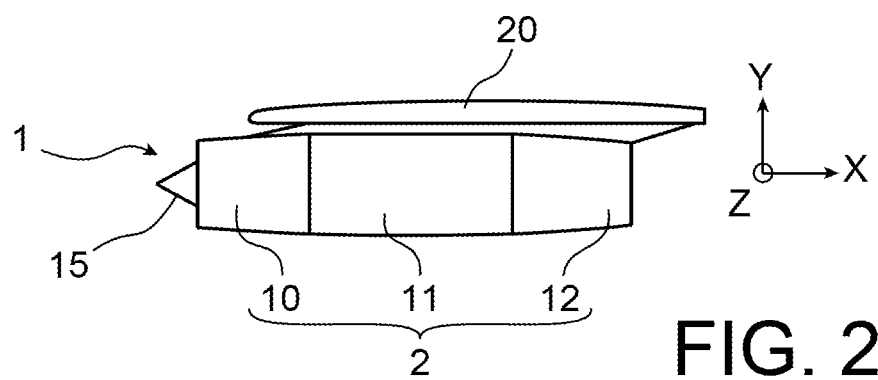
FIG. 2 is a schematic view of a propulsion unit mounted under an aircraft wing.
Figure 3:
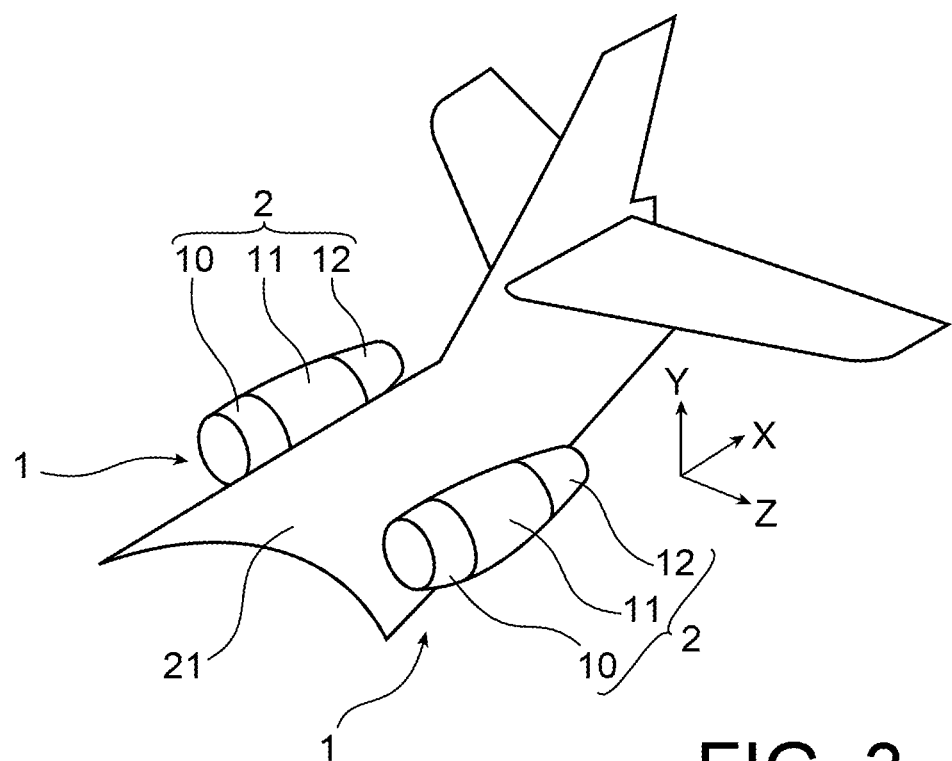
FIG. 3 is a schematic view of two propulsion units mounted laterally in the rear portion of an aircraft fuselage.
Figure 4:
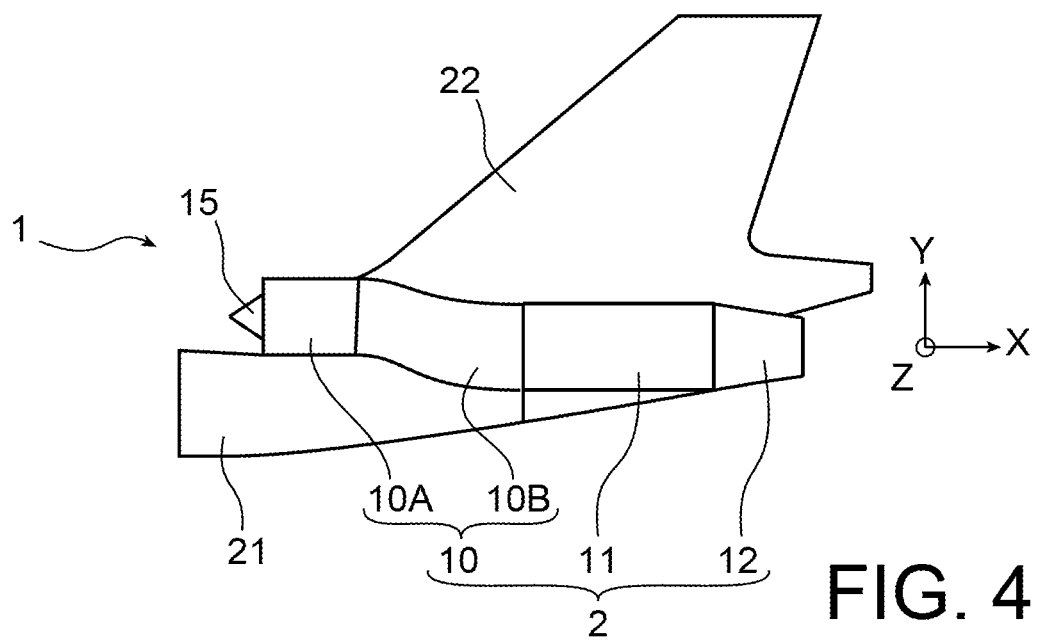
FIG. 4 is a schematic view of a propulsion unit mounted in the rear portion of an aircraft fuselage, under a tail of this aircraft.

FIGS. 2 to 4 illustrate different conventional mounting configurations of such a propulsion unit 1.

FIG. 2 shows a propulsion unit 1 mounted vertically under a wing 20 of an aircraft.

FIG. 3 shows two propulsion units 1 mounted on a fuselage 21 of an aircraft, laterally and in the rear portion of the fuselage 21.

FIG. 4 shows a propulsion unit 1 mounted on a fuselage 21 of an aircraft, in the extension of the fuselage 21 according to the longitudinal direction X and extending vertically under a tail 22 of the aircraft.

In these examples, the propulsion units 1 illustrated in FIGS. 2 to 4 are similar to that of FIG. 1.

In the configuration of FIG. 4, the air inlet 10 comprises an air intake section 10A and an "S"-like shaped section 10B connecting the section 10A and the intermediate section 11 the nacelle 2 together.

In each of the configurations of FIGS. 2 and 4, the propulsion unit 1 further comprises an inlet cone 15 allowing slowing down the airflow entering the air inlet 10.

More specifically, the invention relates to the structural relationships between the nacelle 2 on the one hand, the turbomachine 3 on the other hand, and a support structure described in more detail hereinbelow.

In the configuration of FIG. 2, the support structure forms a portion of a framework of the wing 20.

In the configuration of FIG. 3, the support structure forms a portion of the fuselage 21.

In the configuration of FIG. 4, the support structure forms a portion of the tail 22.

The invention is applicable to each of the configurations of FIGS. 2 to 4 and to variants of these configurations. For example, the invention may also be implemented in a propulsion unit 1 devoid of an inlet cone and mounted according to the configuration of FIG. 2 or 4, or in a propulsion unit 1 including an inlet cone and mounted according to the configuration of FIG. 3.

In addition, the invention also applies to a propulsion unit whose turbomachine is different from that illustrated in FIG. 1. Without limitation, the turbomachine may be a simple or double-flow turbojet engine and comprising, or not, a post-combustion.

By convention, it is considered in this description that the support structure belongs to the propulsion unit 1.

Figure 5:
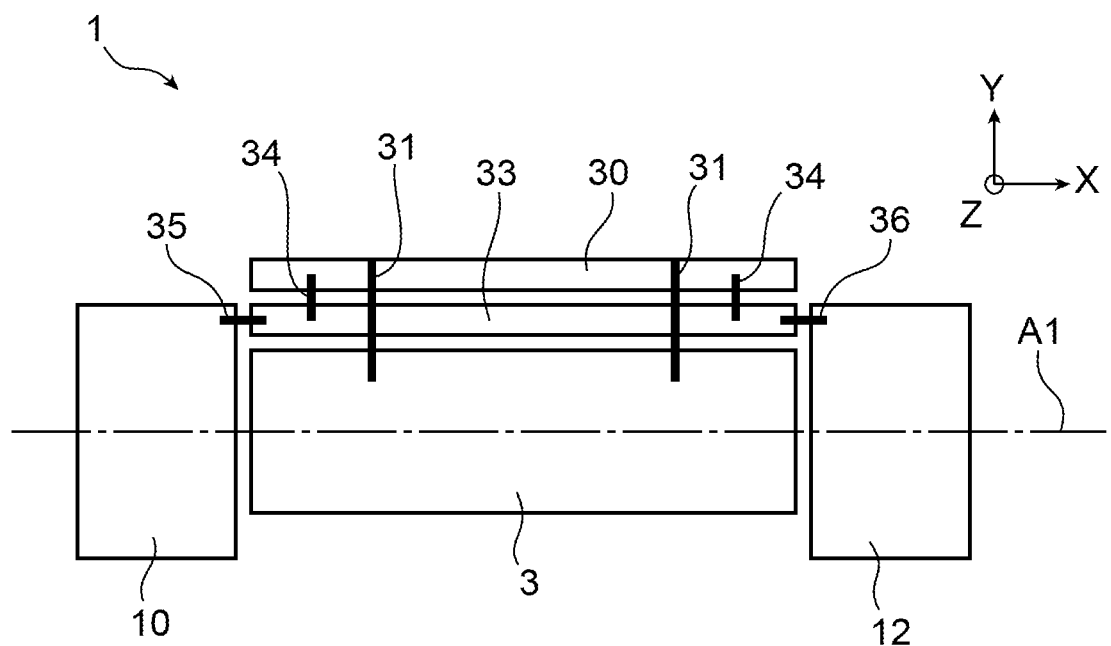
FIG. 5 is a schematic view of a propulsion unit architecture in accordance with the invention, the propulsion unit comprising a turbomachine and a nacelle which are supported independently of each other.

FIG. 5 schematically illustrates a propulsion unit architecture 1 in accordance with the invention.

The propulsion unit 1 of FIG. 5 comprises a support structure 30 which in this example forms a portion of the wing framework 20, according to the configuration of FIG. 2.

The following description applies by analogy to each of the configurations of FIGS. 3 and 4 and more generally to any configuration identical or similar to any one of the configurations of FIGS. 2 to 4.

Referring to FIG. 5, the turbomachine 3 is connected to the support structure 30 by first connecting means 31.

In this example, the first connecting means 31 comprise suspension arms configured to support the turbomachine 3.

Moreover, the propulsion unit 1 of FIG. 5 comprises an intermediate support structure 33 fastened to the support structure 30 by fastening members 34.

In this example, the intermediate support structure 33 forms a portion of the intermediate section 11 of the nacelle 2 meaning that it extends axially between the air inlet 10 and the rear section 12 of the nacelle 2.

In this example, each of the air inlet 10 and the rear section 12 is connected to the intermediate support structure 33 by connecting means 35 and 36, respectively.

The intermediate support structure 33 and the connecting means 35 and 36 form second connecting means, distinct from the first connecting means 31.

This architecture enables the support structure 30 to support on the one hand the turbomachine 3 via the first connecting means 31 and on the other hand the air inlet 10 and the rear section 12 of the nacelle 2 via the second connecting means.

In other words, the turbomachine 3 on the one hand and the air inlet 10 and the rear section 12 of the nacelle 2 on the other hand are supported by the support structure 30 independently.

In comparison with a conventional propulsion unit wherein the air inlet and the rear section of the nacelle are supported by the turbomachine, the invention allows reducing the mass of the turbomachine 3, the latter could therefore be devoid of fastening flanges of the air inlet 10 and of the rear section 12, and allows avoiding generating considerable loads on the turbomachine 3 and thus affecting its dynamic behaviour.

Of course, the second connecting means may be devoid of such an intermediate support structure 33 and the air inlet 10 and/or the rear section 12 of the nacelle 2 may be fastened directly to the support structure 30.

Thus, the following different categories of embodiments could be distinguished in particular. According to a first category of embodiments, the air inlet 10 and the rear section 12 are connected to the intermediate support structure 33. According to a second category of embodiments, the air inlet 10 is connected to the intermediate support structure 33 whereas the rear section 12 is directly connected to the support structure 30. According to a third category of embodiments, the rear section 12 is connected to the intermediate support structure 33 whereas the air inlet 10 is directly connected to the support structure 30. According to a fourth category of embodiments, the air inlet 10 and the rear section 12 are directly connected to the support structure 30.

The intermediate support structure 33 of FIG. 5 may have any geometry suitable for supporting the air inlet 10 and/or the rear section 12. For example, the intermediate support structure 33 may form a beam, a box, a cradle, a lattice structure or any other structure capable of connecting the air inlet 10 and/or the rear section 12 to the support structure 30.

Figure 6:
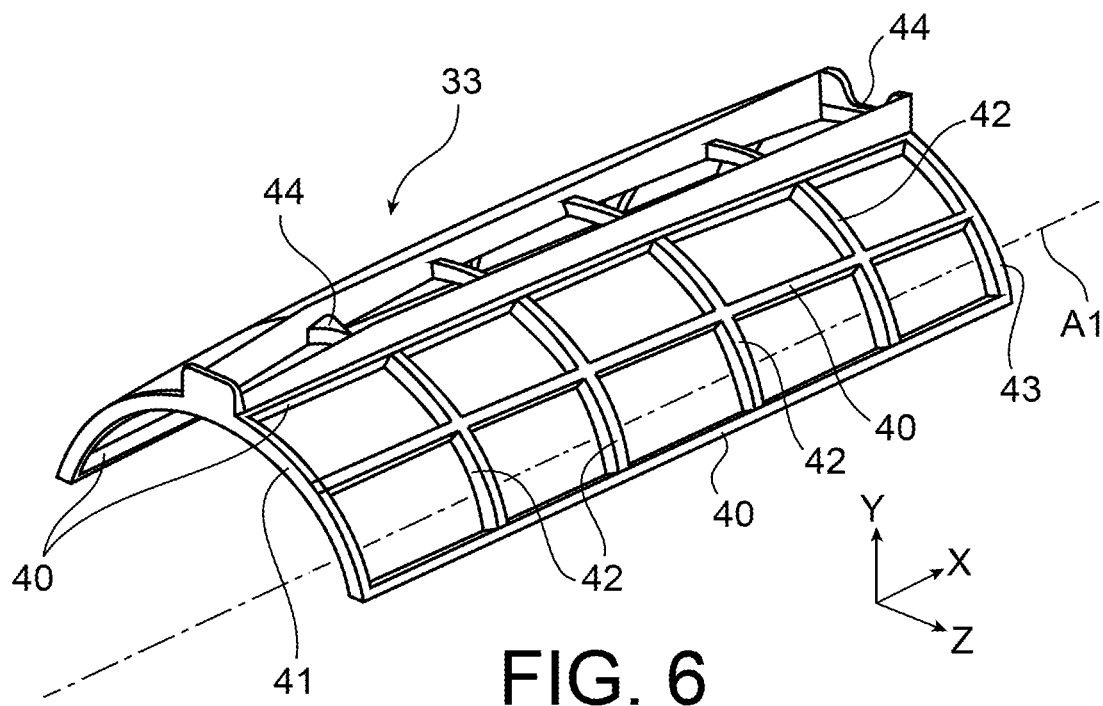
FIG. 6 is a schematic view of a nacelle support cradle for a propulsion unit having an architecture in accordance with FIG. 5.

In one embodiment, the intermediate support structure 33 forms a cradle as illustrated in FIG. 6.

The cradle 33 comprises spars 40 and ring sections 41, 42 and 43 connected together so as to form a lattice structure.

Such a structure is both robust and light.

In this example, the cradle 33 comprises six spars 40 extending parallel to the axial direction X and being circumferentially spaced apart from each other, as well as six ring sections 41, 42 and 43 spaced apart from each other along the axial direction X.

The cradle of FIG. 6 has a plane of symmetry Z-X passing through the longitudinal central axis A1, three of said spars 40 extending from one side of this plane of symmetry and the other three spars 40 extending from the other side of this plane of symmetry.

The cradle 33 also comprises a hooking structure 44 configured to cooperate with said fastening members 34 so as to fasten the cradle 33 on the support structure 30 (cf. FIGS. 5 and 6).

The ring section 41 is located at one of the axial ends of the cradle 33 and forms a front frame. The ring section 43 is located at the other axial end of the cradle 33 and forms a rear frame. The ring sections 42 extend axially between the front frame 41 and the rear frame 43.

When the cradle is fastened to the support structure 30 of the propulsion unit 1, the ring sections 41, 42 and 43 and therefore the cradle 33 in its entirety extend circumferentially around the longitudinal central axis A1.

In this example, the cradle 33 has a circumferential dimension of smaller than 180°, this dimension being in this case defined by the circumferential dimension of each of the ring sections 41, 42 and 43.

Figure 7:
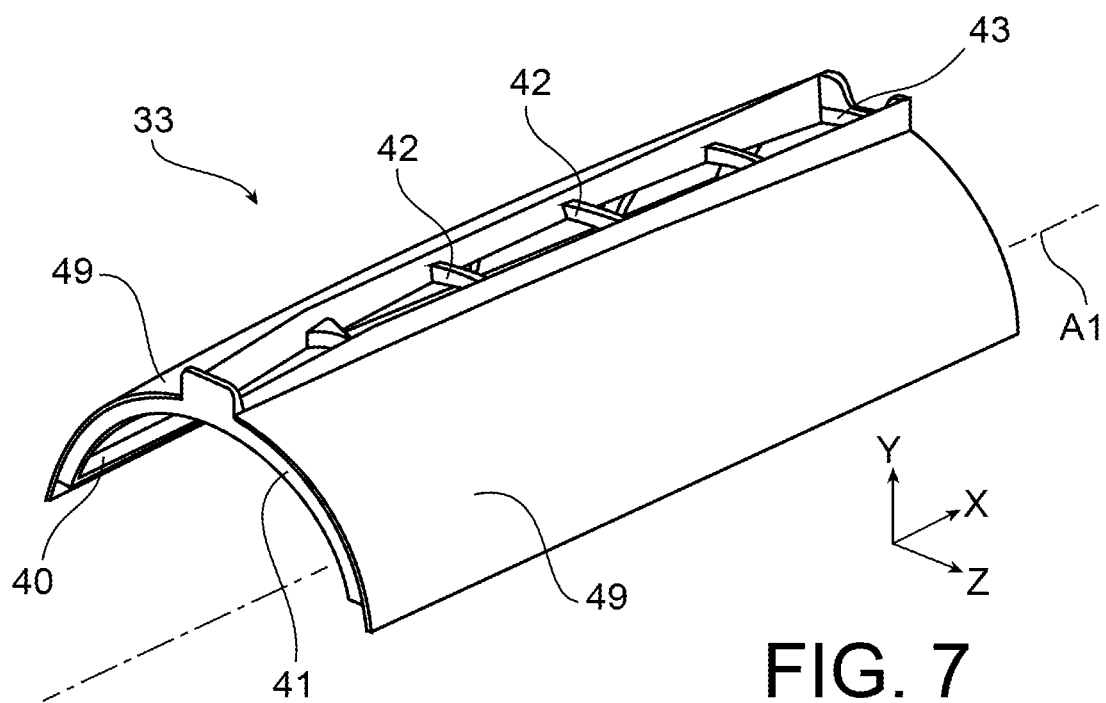
FIG. 7 is a schematic view of the cradle of FIG. 6 covered with outer skins.

FIG. 7 shows the cradle 33 partially covered with outer skins 49 forming a fairing.

Referring to FIGS. 5 and 6, the air inlet 10 of the nacelle 2 is in this example mounted cantilevered on the cradle 33, while being connected to the front frame 41 of the cradle 33 by the connecting means 35.

Similarly, the rear section 12 of the nacelle 2 is in this example mounted cantilevered on the cradle 33, while being connected to the rear frame 43 of the cradle 33 by the connecting means 36.

In this embodiment, the air inlet 10 and the rear section 12 of the nacelle 2 bear axially, or likely to bear axially, respectively on the front frame 41 and the rear frame 43 of the cradle 33, i.e. over a circumferential sector smaller than 180°.

In other embodiments not represented, the front frame 41 and/or the rear frame 43 of the cradle 33 are annular so that the air inlet 10 and/or the rear section 12 are mounted over their entire circumference bearing axially on the cradle 33.

In this example, the suspension arms 31 of the turbomachine 3 pass through openings formed by the cradle 33 (cf. FIGS. 5, 6 and 8), i.e. openings delimited axially by two respective ring sections and by two respective spars of the cradle 33.

The concept consisting in having the intermediate support structure 33, and more generally the second connecting means, crossed by the first connecting means 31 is also applicable to an intermediate support structure having a geometry different from that of the cradle of FIG. 6. For example, in an embodiment wherein the intermediate support structure is a beam, openings may be formed in the beam so that the first connecting means could extend through these openings (not represented).

Figure 8:
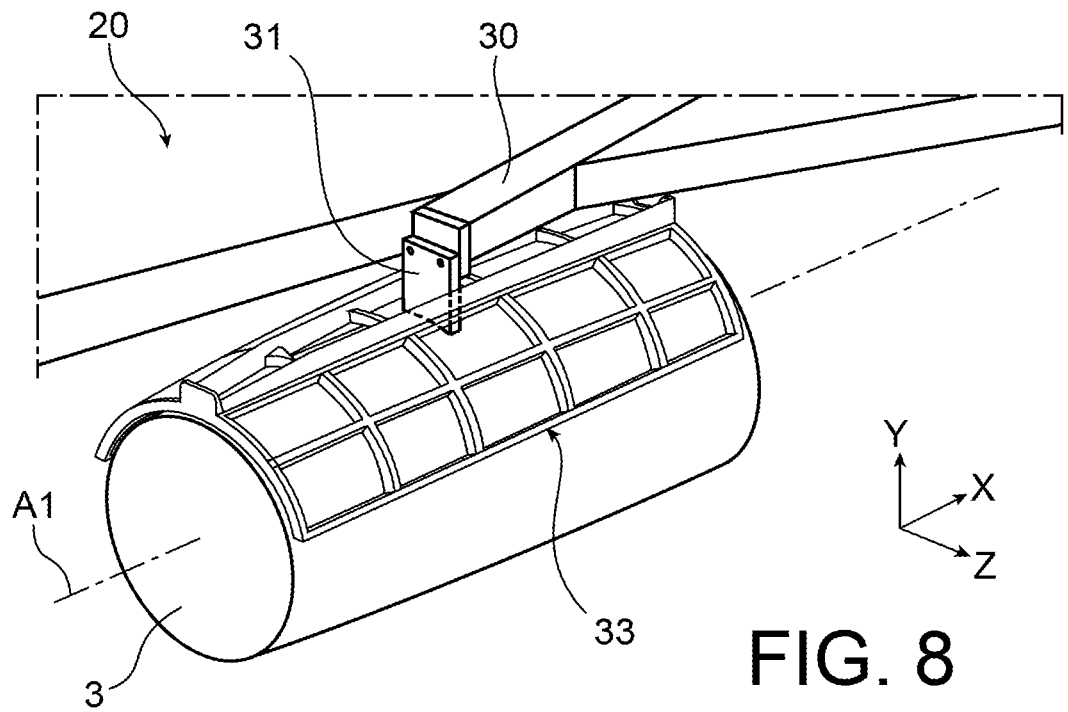
FIG. 8 is a schematic view of an aircraft wing framework under which are suspended the cradle of FIG. 6 and a turbomachine in accordance with the architecture of FIG. 5.

FIG. 8 shows an aircraft portion including a propulsion unit 1 having the architecture of FIG. 5 and comprising as an intermediate support structure 33 the cradle of FIG. 6. More specifically, FIG. 8 shows a framework 30 of an aircraft wing 20, the cradle 33 and the turbomachine 3 fastened to the framework 30 by the suspension arms 31 (only one arm being shown in this figure). The members 34 for fastening the cradle 33 on the framework 30 are not shown in FIG. 8.

Figure 9:
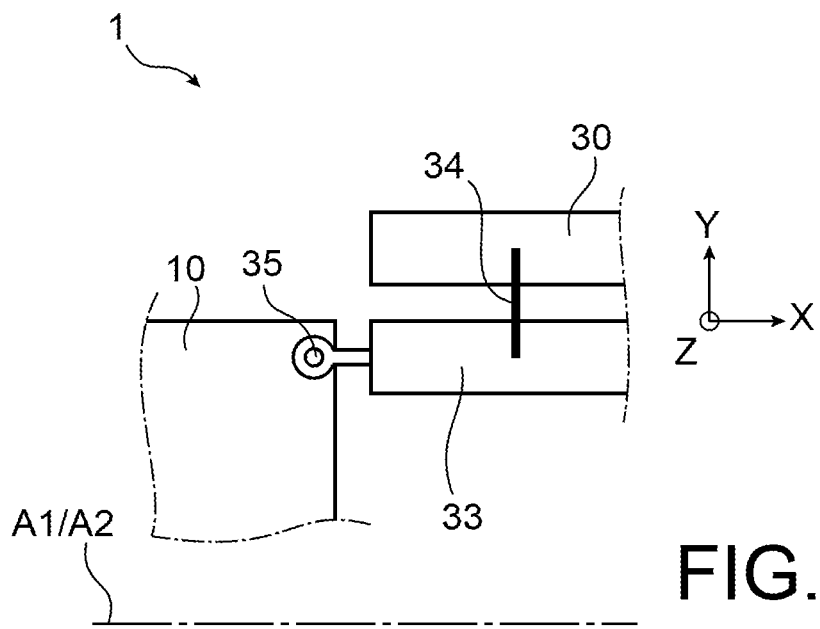
FIG. 9 is a schematic view of a propulsion unit in accordance with the invention, comprising a main support structure, an intermediate support structure and an air inlet hinged on the intermediate support structure, the air inlet being in a flight position.
Figure 10:
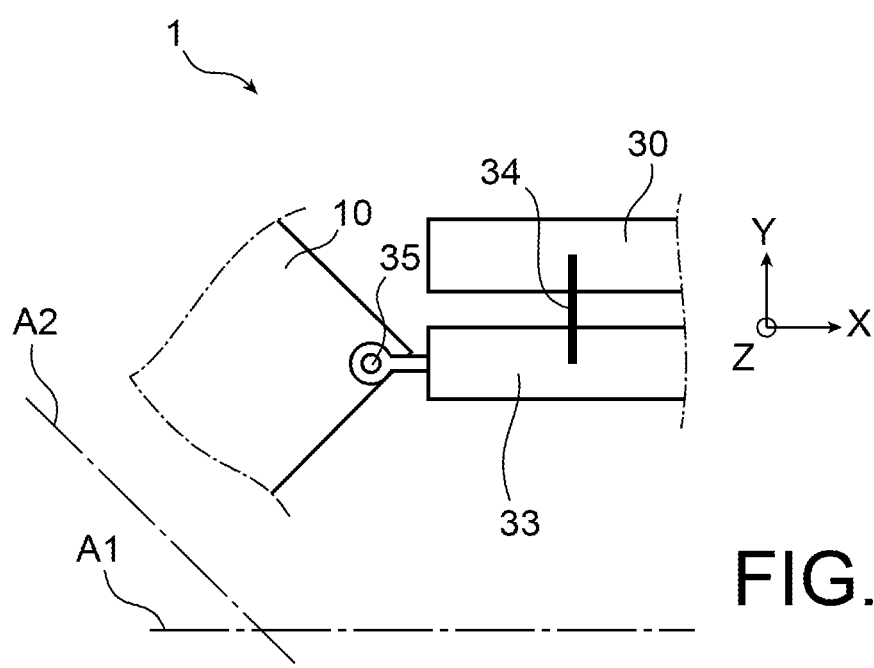
FIG. 10 is a schematic view of the propulsion unit of FIG. 9, the air inlet being in a maintenance position.

FIGS. 9 and 10 illustrate an embodiment wherein the air inlet 10 is connected to the intermediate support structure 33 according to a pivot connection allowing moving the air inlet between a flight position (FIG. 9) and a maintenance position (FIG. 10).

In the flight position (FIG. 9), the air inlet 10 has a central axis A2 which in this example is coincident with the longitudinal central axis A1 of the propulsion unit 1. Of course, these axes A1 and A2 may alternatively not be coincident with each other, for example in the context of an architecture as illustrated in FIG. 4.

In the maintenance position (FIG. 10), the central axis A2 of the air inlet 10 and the longitudinal central axis A1 of the propulsion unit 1 are oblique with respect to each other. Placing the air inlet 10 in the maintenance position facilitates access to the front portion of the turbomachine 3, in particular in the context of an inspection and/or maintenance operation—for example, sanding of blades of the fan 4, replacement of a pressure or temperature probe (not represented), balancing of the turbomachine 3—and allows avoiding dismounting the turbomachine 3 for this purpose.

This embodiment is particularly advantageous when the propulsion unit 1 comprises an inlet cone 15 as illustrated in FIGS. 2 and 4 and/or when the air inlet 10 is relatively long and/or narrow, which is typically the case of a supersonic airplane propulsion unit.

To enable the movement of the air inlet 10 between the flight position and the maintenance position, said connecting means 35 represented in FIG. 5, which connect the air inlet 10 and the intermediate support structure 33 to each other, comprise a hinge member forming in this example a hinge.

Figure 11:
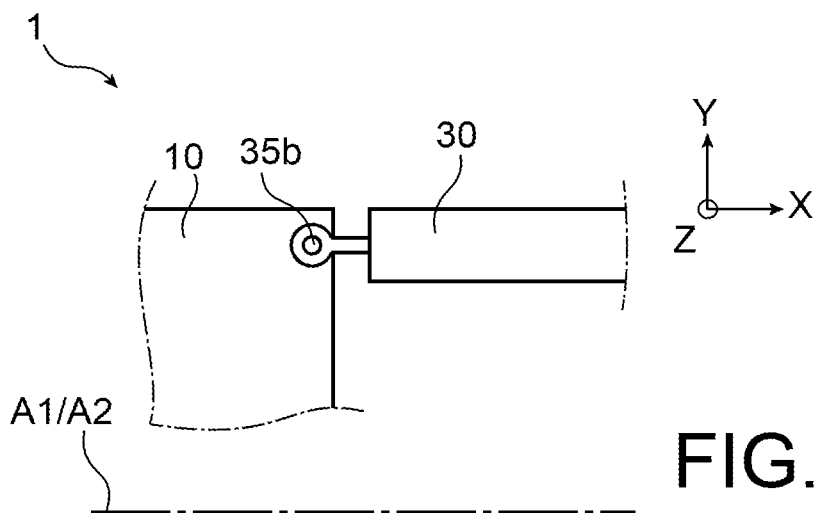
FIG. 11 is a schematic view of a propulsion unit in accordance with the invention, comprising a support structure and an air inlet hinged on the support structure, the air inlet being in a flight position.
Figure 12:
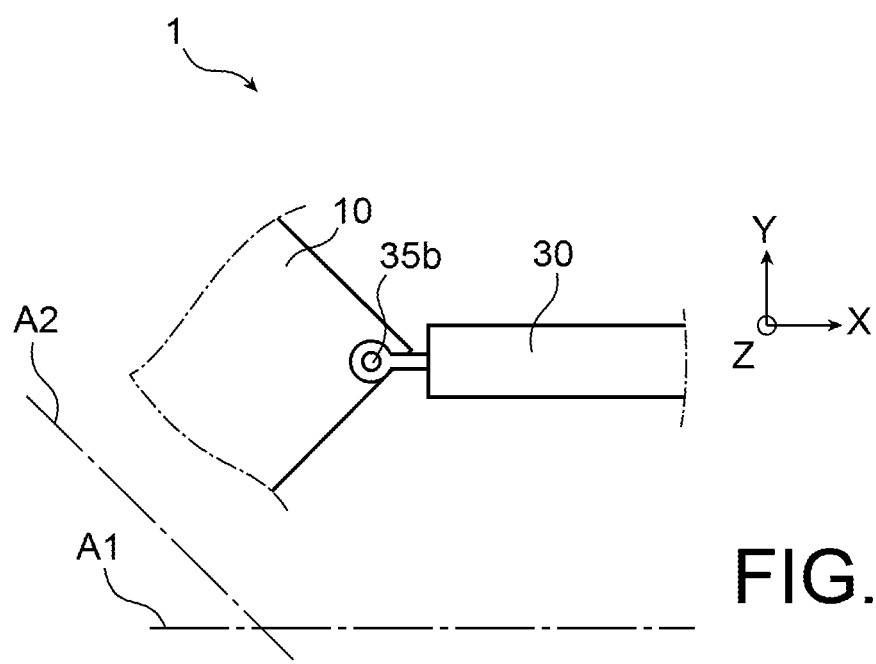
FIG. 12 is a schematic view of the propulsion unit of FIG. 11, the air inlet being in a maintenance position.

FIGS. 11 and 12 show a variant wherein the air inlet 10 is connected by a hinge member 35b to the support structure 30, the hinge member 35b forming a portion of said second connecting means. In other words, in this variant, the air inlet 10 is not fastened or hinged on an intermediate support structure such as the cradle 33 of FIG. 6 but is directly connected to the support structure 30.

What has just been described with reference to FIGS. 9 and 10 applies by analogy to FIGS. 11 and 12.

What has just been described with reference to FIGS. 9 to 12 regarding the hinge of the air inlet 10 may also apply to the rear section 12 (cf. FIGS. 13 to 16).

Figure 13:
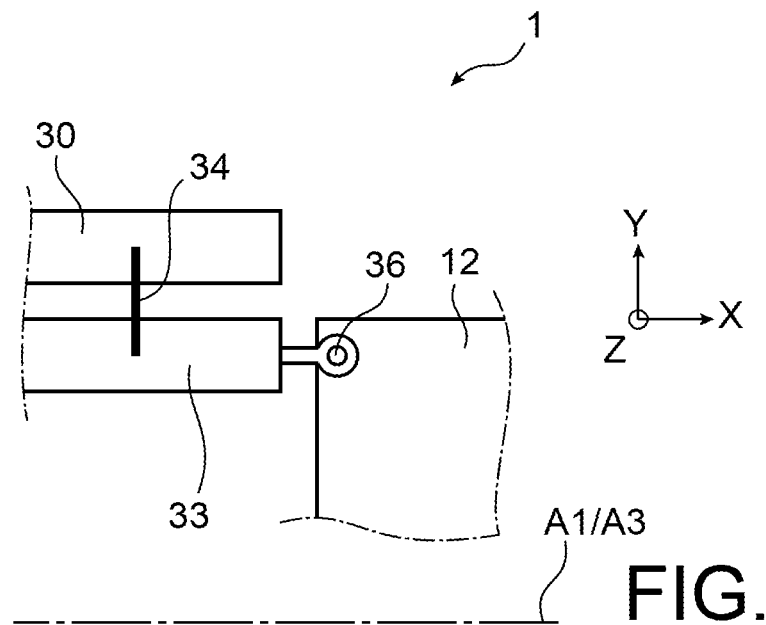
FIG. 13 is a schematic view of a propulsion unit in accordance with the invention, comprising a main support structure, an intermediate support structure and a rear section of the nacelle hinged on the intermediate support structure, the rear section being in a flight position.
Figure 14:
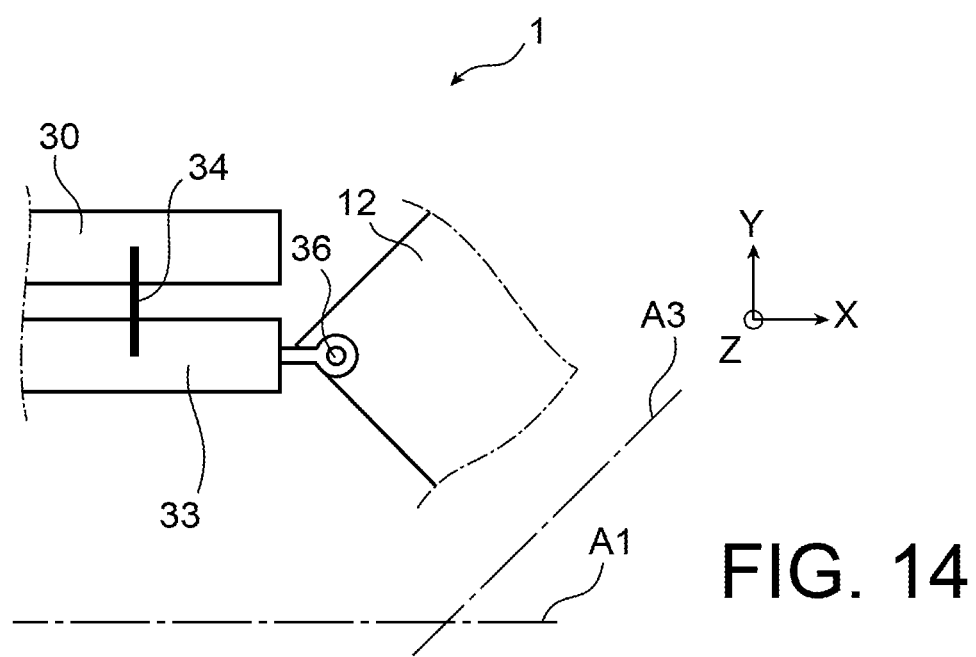
FIG. 14 is a schematic view of the propulsion unit of FIG. 13, the rear section being in a maintenance position.
Figure 15:
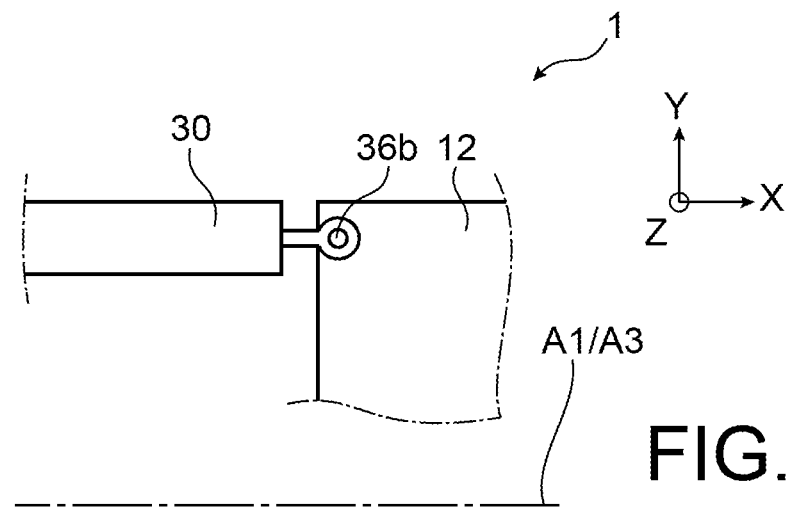
FIG. 15 is a schematic view of a propulsion unit in accordance with the invention, comprising a support structure and a nacelle rear section hinged on the support structure, the rear section being in a flight position.
Figure 16:
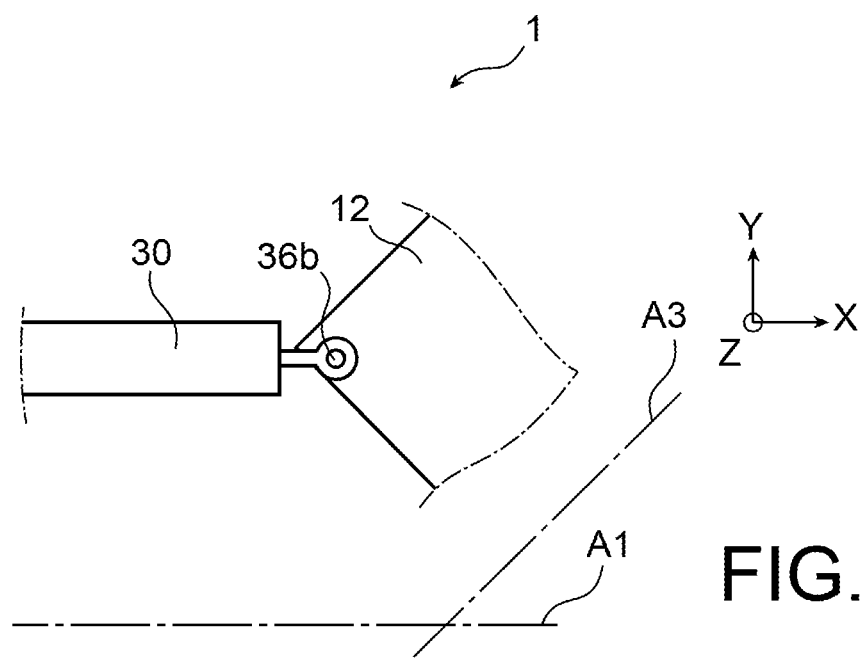
FIG. 16 is a schematic view of the propulsion unit of FIG. 15, the rear section being in a maintenance position.

Thus, the rear section 12 may be connected either to the intermediate support structure 33 (FIGS. 13 and 14) or to the support structure 30 (FIGS. 15 and 16) by a hinge member 36 or 36b allowing moving the section rear 12 between a flight position (FIGS. 13 and 15) and a maintenance position (FIGS. 14 and 16).

The description of FIGS. 9 to 12 applies by analogy to FIGS. 13 to 16, the central axis of the rear section 12 being referenced A3, the hinge member 36b of the embodiment of FIGS. 15 and 16 forming a portion of said second connecting means.

The different embodiments that have just been described may be combined so as to form, for example, the following variants.

In a first type of variants, the propulsion unit 1 comprises an intermediate support structure 33 connected to the support structure 30 in the manner illustrated in FIG. 5 (cf. first, second and third categories of embodiments described hereinabove). In the context of this first type, the invention covers in particular the following variants:

Variant No. 1: each of the air inlet 10 and the rear section 12 is connected to the intermediate support structure 33 by connecting means 35 or 36, respectively, of the conventional fastening means type;

Variant No. 2: the air inlet 10 is hinged on the intermediate support structure 33 according to the principle illustrated in FIGS. 9 and 10, the rear section 12 being connected to the intermediate support structure 33 by connecting means 36 of the conventional fastening means type;

Variant No. 3: the air inlet 10 is connected to the intermediate support structure 33 by connecting means 35 of the conventional fastening means type, the rear section 12 being hinged on the intermediate support structure 33 according to the principle illustrated in FIGS. 13 and 14;

Variant No. 4: each of the air inlet 10 and the rear section 12 is hinged on the intermediate support structure 33 according to the principle illustrated in FIGS. 9 and 10, and in FIGS. 13 and 14, respectively;

Variant No. 5: the air inlet 10 is connected to the support structure 30 by connecting means of the conventional fastening means type, the rear section 12 being hinged on the intermediate support structure 33 according to the principle illustrated in FIGS. 13 and 14;

Variant No. 6: the air inlet 10 is connected to the support structure 30 by connecting means of the conventional fastening means type, the rear section 12 being connected to the intermediate support structure 33 by connecting means 36 of the conventional fastening means type;

Variant No. 7: the air inlet 10 is connected to the intermediate support structure 33 by connecting means 35 of the conventional fastening means type, the rear section 12 being connected to the support structure 30 by connecting means of the conventional fastening means type;

Variant No. 8: the air inlet 10 is hinged on the intermediate support structure 33 according to the principle illustrated in FIGS. 9 and 10, the rear section 12 being connected to the support structure 30 by connecting means of the conventional fastening means type;

Variant No. 9: the air inlet 10 is hinged on the support structure 30 according to the principle illustrated in FIGS. 11 and 12, the rear section 12 being connected to the intermediate support structure 33 by connecting means 36 of the conventional fastening means type;

Variant No. 10: the air inlet 10 is hinged on the support structure 30 according to the principle illustrated in FIGS. 11 and 12, the rear section 12 being hinged on the intermediate support structure 33 according to the principle illustrated in FIGS. 13 and 14;

Variant No. 11: the air inlet 10 is connected to the intermediate support structure 33 by connecting means 35 of the conventional fastening means type, the rear section 12 being hinged on the support structure 30 according to the principle illustrated in FIGS. 15 and 16;

Variant No. 12: the air inlet 10 is hinged on the intermediate support structure 33 according to the principle illustrated in FIGS. 9 and 10, the rear section 12 being hinged on the support structure 30 according to the principle illustrated in FIGS. 15 and 16.

Thus, variants No. 1 to 4 form embodiments belonging to said first category, variants No. 7, 8, 11 and 12 form embodiments belonging to said second category, and variants No. 5, 6, 9 and 10 form embodiments belonging to said third category.

In a second type of variants, forming embodiments belonging to said fourth category, the air inlet 10 and the rear section 12 are both mounted on the support structure 30, and not on an intermediate support structure 33 as illustrated in FIG. 5. In the context of this second type, the invention covers in particular the following variants:

Variant No. 13: each of the air inlet 10 and the rear section 12 is hinged on the support structure 30 according to the principle illustrated in FIGS. 11 and 12, and in FIGS. 15 and 16, respectively;

Variant No. 14: the air inlet 10 is hinged on the support structure 30 according to the principle illustrated in FIGS. 11 and 12, the rear section 12 being connected to the support structure 30 by connecting means of the conventional fastening means type;

Variant no. 15: the air inlet 10 is connected to the support structure 30 by connecting means of the conventional fastening means type, the rear section 12 being hinged on the support structure 30 according to the principle illustrated in FIGS. 15 and 16, Variant No. 16: each of the air inlet 10 and the rear section 12 is connected to the support structure 30 by connecting means of the conventional fastening means type.

In the foregoing, said conventional fastening means are for example bolts and are preferably removable.

The aforementioned principle of hinging the air inlet 10 and/or the rear section 12 may be implemented in each of the configurations of FIGS. 2 to 4.

In all of the above-described embodiments, the propulsion unit 1 preferably comprises one or more seal(s) and/or fire-stop(s) (not represented) interposed on the one hand between the air inlet 10 and a casing of the turbomachine 3 and/or on the other hand between the rear section 12 and a casing of the turbomachine 3.

In embodiments wherein the air inlet 10 is hinged in the manner described hereinabove with reference to FIGS. 9 to 12, such a seal is preferably configured to be compressed when the air inlet 10 is moved from the maintenance position to the flight position. Likewise, in embodiments wherein the rear section 12 is hinged in the manner described hereinabove with reference to FIGS. 13 to 16, such a seal is preferably configured to be compressed when the rear section 12 is moved from the maintenance position to the flight position.

In the following examples, the air inlet 10 and/or the rear section 12 of the nacelle 2 are held in the maintenance position by one or more connecting rod(s) 50.

Figure 17:
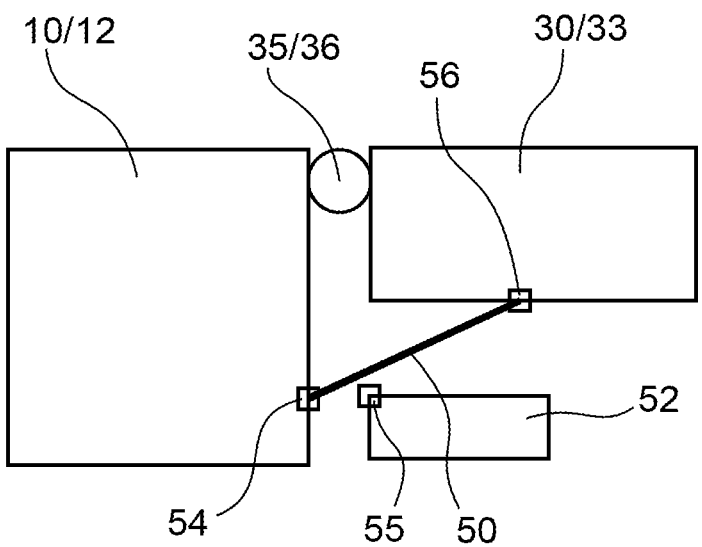
FIG. 17 is a schematic view of a propulsion unit comprising a nacelle element hinged on a support structure, the nacelle element being in a flight position, the propulsion unit comprising a connecting rod configured to ensure a structural reinforcement function, the connecting rod comprising a first end hinged on the nacelle element and a second end connected to the support structure in a detachable manner.
Figure 18:
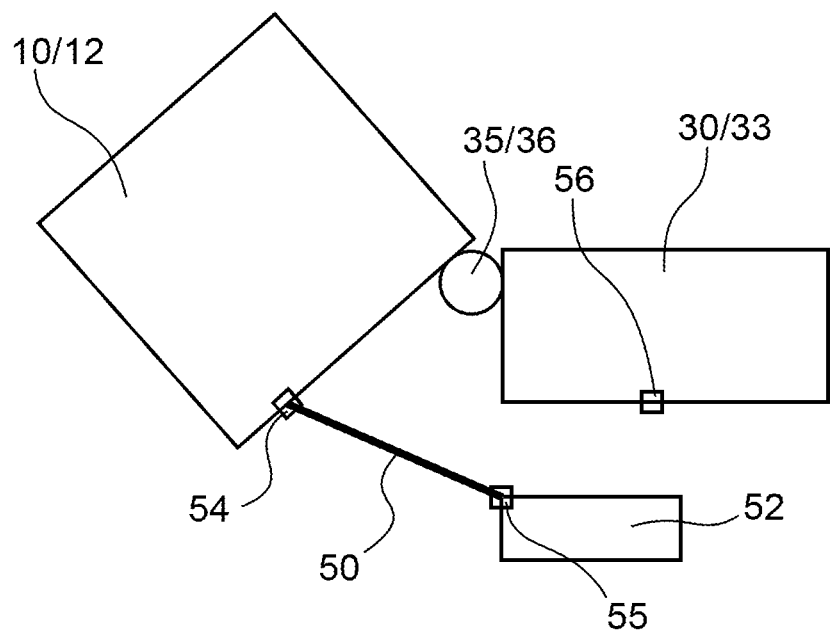
FIG. 18 is a schematic view of the propulsion unit of FIG. 17, the nacelle element being in a maintenance position, the connecting rod being configured to hold the nacelle element in the maintenance position, the second end of the connecting rod being detachably connected to a fixed portion of the propulsion unit.

FIGS. 17 and 18 show one of these nacelle elements, i.e. the air inlet 10 or the rear section 12, respectively in the flight position and in the maintenance position.

In the maintenance position (FIG. 18), the connecting rod 50 ensures a function of holding the nacelle element 10 or 12 in this position.

For this purpose, a first end of the connecting rod 50 cooperates with the nacelle element 10 or 12 and a second end of the connecting rod 50 cooperates with a fixed portion 52 of the propulsion unit 1.

In the flight position (FIG. 17), the connecting rod 50 ensures a structural reinforcement function so as to transmit forces from the nacelle element 10 or 12 to the support structure 30 or to the intermediate support structure 33 or, vice versa, from the support structure 30 or from the intermediate support structure 33 to the nacelle element 10 or 12.

For this purpose, the first end of the connecting rod 50 cooperates with the nacelle element 10 or 12 and the second end of the connecting rod 50 cooperates with the support structure 30 or the intermediate support structure 33.

In order to enable this position change, the first end of the connecting rod 50 is in this example connected to the nacelle element 10 or 12 according to a pivot connection 54.

In this example, said fixed portion 52 of the propulsion unit 1 comprises a first attachment means 55 and the support structure 30 or the intermediate support structure 33 comprises a second attachment means 56.

When the nacelle element 10 or 12 is in the flight position (FIG. 17), the second end of the connecting rod 50 cooperates in a removable manner with the second attachment means 56.

When the nacelle element 10 or 12 is in the maintenance position (FIG. 18), the second end of the connecting rod 50 cooperates in a removable manner with the first attachment means 55.

Figure 19:
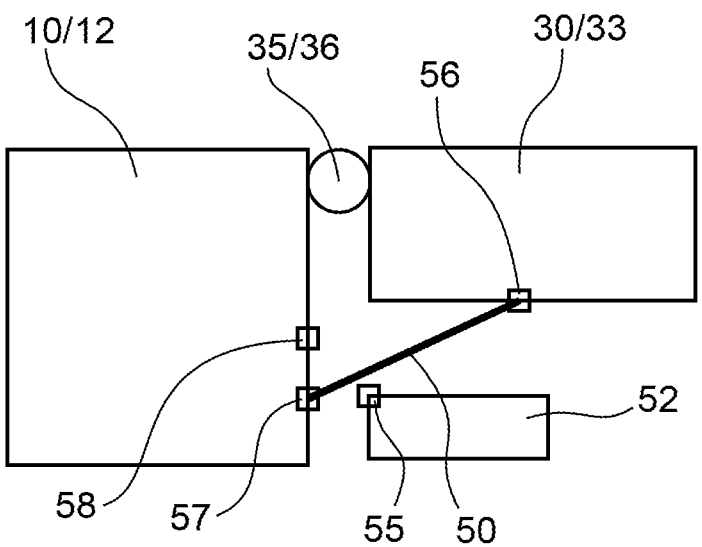
FIG. 19 is a schematic view of a propulsion unit comprising a nacelle element hinged on a support structure, the nacelle element being in a flight position, the propulsion unit comprising a connecting rod configured to ensure a structural reinforcement function, the connecting rod comprising a first end detachably connected to a first portion of the nacelle element and a second end detachably connected to the support structure.
Figure 20:
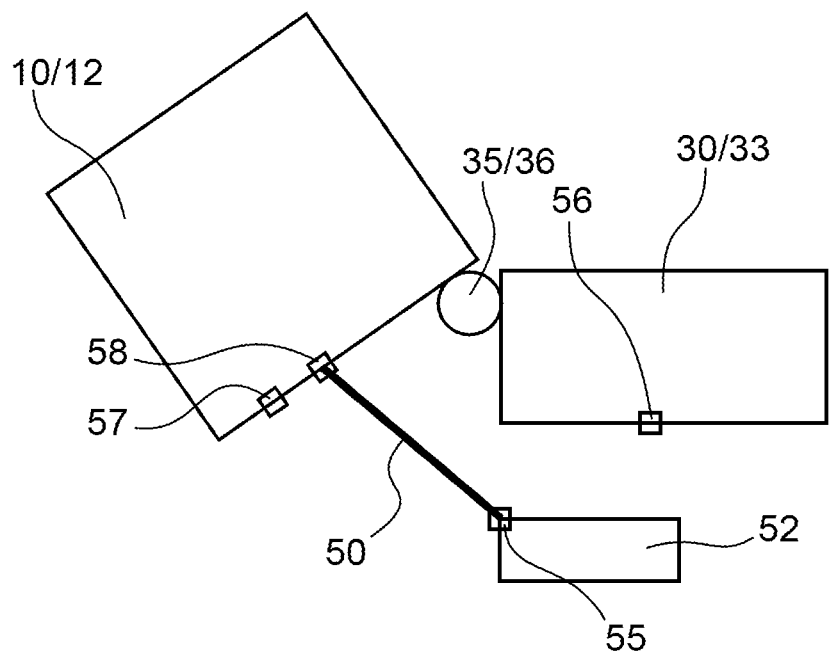
FIG. 20 is a schematic view of the propulsion unit of FIG. 19, the nacelle element being in a maintenance position, the connecting rod being configured to hold the nacelle element in the maintenance position, the first end of the connecting rod being detachably connected to a second portion of the nacelle element, the second end of the connecting rod being detachably connected to said fixed portion of the propulsion unit.

FIGS. 19 and 20 illustrate a variant which differs from that of FIGS. 17 and 18 in that the nacelle element 10 or 12 comprises two attachment means 57 and 58 configured so that, when the nacelle 10 or 12 is in the flight position (FIG. 19), the second end of the connecting rod 50 cooperates in a removable manner with one of these attachment means 57 and so that, when the nacelle element 10 or 12 is in the maintenance position (Figure the second end of the connecting rod 50 cooperates in a removable manner with the other attachment means 58.

In each of these embodiments, the connecting rod 50 may be telescopic and/or have a curved geometry allowing, for example, matching with the contours of the turbomachine 3 when the nacelle element 10 or 12 is in the flight position.

To facilitate the attachment/separation of the connecting rod 50 with respect to the attachment means 55, 56, 57 and/or 58, these may comprise a ball lock mechanism known as "quick-release pin".

The connecting rod 50 may comprise a foolproof device enabling an operator to ensure that it is properly mounted in the flight position before the propulsion unit 1 is put into service.

The turbomachine 3 and/or the nacelle element 10 or 12 may comprise one or more centring pin(s) (not represented) allowing ensuring proper positioning of the nacelle element 10 or 12 in the flight position.

In one embodiment, this or these centring pin(s) is/are designed to yield or melt in the event of severe imbalance or loss of a blade.

In an embodiment not represented, the movement of the nacelle element 10 or 12 between the flight position and the maintenance position is ensured by an actuator comprising one or more cylinder(s).

Of course, several connecting rods similar to the connecting rod 50 may be implemented simultaneously. For example, two connecting rods may be used per nacelle element 10 or 12.

What has just been described with reference to FIGS. 17 to 20 applies either to the air inlet 10 alone, or to the rear section 12 alone, or to both the air inlet 10 and the rear section 12, that being so regardless of the variant selected amongst the combinations described hereinabove with reference to FIGS. 9 to 16.

As a non-limiting example, the invention thus covers a propulsion unit 1 having an architecture in accordance with variant No. 2 described hereinabove, i.e. wherein the air inlet 10 is hinged on the intermediate support structure 33, and comprising two connecting rods similar to the connecting rod 50 of FIGS. 19 and 20 extending symmetrically on either side of the intermediate support structure 33 and on either side of the hinge member 35.

What is claimed is:

1. A propulsion unit for an aircraft, comprising a nacelle, a support structure and first connecting means configured to connect a propelling turbomachine to the support structure, the nacelle comprising an air inlet and a gas ejection rear section, wherein the propulsion unit further comprises second connecting means connecting the air inlet and/or the rear section of the nacelle to the support structure so that the support structure supports the propelling turbomachine via the first connecting means and so that the support structure supports the air inlet and/or the rear section of the nacelle via the second connecting means, the second connecting means comprising a hinge member configured to enable a movement of a nacelle element, said nacelle element being one of the air inlet and the rear section, between:
    a flight position, in which a central axis of said nacelle element and a longitudinal central axis of the propulsion unit are coincident with or parallel to each other, and
    a maintenance position, in which the central axis of said nacelle element and the longitudinal central axis of the propulsion unit are oblique or perpendicular to each other.

2. The propulsion unit according to claim 1, wherein the first connecting means pass through the second connecting means.

3. An aircraft comprising a propulsion unit according to claim 1, said support structure forming a wing or fuselage or tail element.

4. The aircraft according to claim 3, wherein the aircraft is a supersonic airplane.

5. The propulsion unit according to claim 1, comprising a connecting rod configured to hold said nacelle element in the maintenance position and to transmit forces from one to the other among the nacelle element and the support structure when the nacelle element is in the flight position.

6. The propulsion unit according to claim 5, wherein the connecting rod is telescopic.

7. The propulsion unit according to claim 5, wherein an end of the connecting rod is removably attachable to the support structure.

8. The propulsion unit according to claim 1, wherein the second connecting means comprise an intermediate support structure fastened to the support structure, the air inlet and/or the rear section of the nacelle being connected to the intermediate support structure.

9. The propulsion unit according to claim 8, wherein the intermediate support structure forms a cradle extending circumferentially around the longitudinal central axis of the propulsion unit.

10. The propulsion unit according to claim 8, wherein the intermediate support structure comprises:
    a front frame forming a ring section configured to fasten the air inlet of the nacelle thereto, and/or
    a rear frame forming a ring section configured to fasten the rear section of the nacelle thereto.

11. The propulsion unit according to claim 8, wherein the air inlet and/or the rear section of the nacelle are mounted cantilevered on the intermediate support structure.

* * * * *